(12) United States Patent
Kato et al.

(10) Patent No.: US 11,292,902 B2
(45) Date of Patent: Apr. 5, 2022

(54) MODIFIED ELASTOMER COMPOSITION, CROSSLINKED ELASTOMER COMPOSITION, AND MOLDED ARTICLE THEREOF

(71) Applicant: MCPP Innovation LLC, Tokyo (JP)

(72) Inventors: Manami Kato, Tokyo (JP); Seiji Matsumoto, Tokyo (JP); Yasushi Hirota, Tokyo (JP)

(73) Assignee: MCPP Innovation LLC, Tokyo (JP)

( * ) Notice: Subject to any disclaimer, the term of this patent is extended or adjusted under 35 U.S.C. 154(b) by 0 days.

(21) Appl. No.: 16/943,044

(22) Filed: Jul. 30, 2020

(65) Prior Publication Data

US 2020/0354556 A1 Nov. 12, 2020

Related U.S. Application Data

(63) Continuation of application No. PCT/JP2019/001631, filed on Jan. 21, 2019.

(30) Foreign Application Priority Data

Jan. 31, 2018 (JP) .............................. JP2018-015414
Jan. 31, 2018 (JP) .............................. JP2018-015416

(51) Int. Cl.
*C08L 23/16* (2006.01)
*C08L 23/06* (2006.01)
*C08L 23/12* (2006.01)

(52) U.S. Cl.
CPC .............. *C08L 23/16* (2013.01); *C08L 23/06* (2013.01); *C08L 23/12* (2013.01)

(58) Field of Classification Search
CPC ............ C08L 23/08; C08L 23/16; C08K 5/14
See application file for complete search history.

(56) References Cited

U.S. PATENT DOCUMENTS

| | | | |
|---|---|---|---|
| 8,399,104 B2 | 3/2013 | Natsuyama et al. | |
| 2003/0144415 A1 | 7/2003 | Wang et al. | |
| 2005/0043484 A1 | 2/2005 | Wang et al. | |
| 2010/0112366 A1 | 5/2010 | Natsuyama et al. | |
| 2010/0240784 A1 | 9/2010 | Moscardi et al. | |
| 2012/0301991 A1* | 11/2012 | Devisme | C08L 51/06 438/64 |
| 2017/0349737 A1 | 12/2017 | Chiba et al. | |
| 2017/0349738 A1 | 12/2017 | Chiba et al. | |

FOREIGN PATENT DOCUMENTS

| | | |
|---|---|---|
| JP | H08-020691 A | 1/1996 |
| JP | H08-020703 A | 1/1996 |
| JP | H08-092437 A | 4/1996 |
| JP | 2005-516098 A | 6/2005 |
| JP | 2008-266615 A | 11/2008 |
| JP | 5346285 B2 | 11/2013 |
| JP | 2014-062239 A | 4/2014 |
| JP | WO2016/140252 A1 | 9/2016 |
| WO | 2011/062809 A1 | 5/2011 |
| WO | 2016/140251 A1 | 9/2016 |
| WO | 2016/140253 A1 | 9/2016 |

OTHER PUBLICATIONS

Extended European Search Report issued in corresponding European Patent Application No. 19747872.0 dated Mar. 3, 2021.
Database WPI Week 199445, Thomson Scientific, AN 1994-363710 (1994).
International Search Report issued in related International Patent Application No. PCT/JP2019/001631 dated Mar. 19, 2019.

* cited by examiner

*Primary Examiner* — Jeffrey C Mullis
(74) *Attorney, Agent, or Firm* — Morgan, Lewis & Bockius LLP

(57) ABSTRACT

Provided is a modified elastomer composition comprising components (A), (B'), and (D), wherein components (A), (B') and (D) are grafted with component (E), component (A) comprises an ethylene-α-olefin-non-conjugated diene copolymer rubber, component (B') comprises an ethylene-α-olefin copolymer rubber whose melting end peak temperature measured using a differential scanning calorimeter (DSC) is 90° C. or higher, component (D) comprises an unsaturated silane compound, and component (E) comprises a peroxide.

15 Claims, No Drawings

MODIFIED ELASTOMER COMPOSITION, CROSSLINKED ELASTOMER COMPOSITION, AND MOLDED ARTICLE THEREOF

TECHNICAL FIELD

The present invention relates to a modified elastomer composition, to a crosslinked elastomer composition, and to a molded article thereof.

The first invention relates to a modified elastomer composition and a crosslinked elastomer composition that are excellent in compression set, durability, and extrusion-molded appearance and to a molded article using the same.

The second invention relates to a novel low-gloss modified elastomer composition and a novel low-gloss crosslinked elastomer composition excellent in compression set, durability, blocking resistance, and moldability and to a molded article using the same.

BACKGROUND ART

A thermoplastic elastomer is an elastomer that softens and becomes flowable when heated and exhibits rubber elasticity when cooled. The thermoplastic elastomer has moldability equivalent to that of thermoplastic resins and also has rubber elasticity. The thermoplastic elastomer is recyclable and is therefore used in a wide variety of applications such as automobile components, building components, medical components, wire-coating materials, and sundry goods.

When a thermoplastic elastomer is used in applications that require sealing properties, it is important for the thermoplastic elastomer to have good rubber elasticity, good compression set characteristics, good moldability, and good extrusion-molded appearance.

Since a thermoplastic resin such as a polyolefin is mixed into a thermoplastic elastomer in order to provide thermoplasticity, its compression set characteristics are insufficient as compared with thermosetting rubber, so that the applications of the thermoplastic elastomer are limited. A thermosetting rubber such as EPDM has good compression set characteristics but requires a long crosslinking process, and its durability is low.

PTL 1 to PTL 3 propose silane-modified elastomer compositions with improved compression set. In PTL 1 to PTL 3, it is necessary to add a large amount of an unsaturated silane compound in order to improve the compression set, and this impairs economic efficiency and productivity. Moreover, these silane-modified elastomer compositions are highly glossy and are not suitable as sealing materials. Another problem is that, during or after the formation of pellets, blocking is likely to occur.

Also, PTL 4 proposes a silane-modified elastomer composition. In PTL 4, the compression set (70° C.×22 hours) was only a little over 50% and was insufficient.

PTL 5 proposes a dynamically vulcanized thermoplastic elastomer composition using a vulcanizing agent such as a phenolic resin. In PTL 5, since the components of the thermoplastic elastomer composition include a non-crosslinked thermoplastic resin, the compression set is insufficient, as described above.

PTL 1: International Publication No. 2016/140251
PTL 2: International Publication No. 2016/140252
PTL 3: International Publication No. 2016/140253
PTL 4: Japanese Patent No. 5346285
PTL 5: Japanese Unexamined Patent Application Publication (Translation of PCT Application) No. 2005-516098

SUMMARY OF INVENTION

An object of the first invention is to provide a modified elastomer composition and a crosslinked elastomer composition that exhibit compression set characteristics comparable to those of thermosetting rubbers in the related art, have durability and moldability comparable to those of thermoplastic elastomer compositions in the related art, and have good extrusion-molded appearance and to provide a molded article of the modified elastomer composition or the crosslinked elastomer composition.

The inventors have found that a modified elastomer composition obtained by graft modification of a composition containing: an ethylene-α-olefin-non-conjugated diene copolymer rubber; an ethylene-α-olefin copolymer rubber containing no non-conjugated diene units; polyethylene, polypropylene, or a propylene-α-olefin copolymer; and an unsaturated silane compound or a crosslinked elastomer composition obtained by subjecting the above modified elastomer composition to a crosslinking reaction can have compression set characteristics comparable to those of thermosetting rubbers and easy extrusion moldability comparable to that of thermoplastic elastomers. These compression set characteristics and extrusion moldability have been thought to be impossible to achieve simultaneously, and a molded article excellent in compression set and having good extrusion-molded appearance can thereby be obtained. Thus, the first invention has been completed.

The first invention is summarized in the following [1] to [10].

[1] A modified elastomer composition comprising following components (A) to (D) and grafted with following component (E):

component (A): an ethylene-α-olefin-non-conjugated diene copolymer rubber;

component (B): an ethylene-α-olefin copolymer rubber in which a content of ethylene units is 60% to 99% by mass and which contains no non-conjugated diene units;

component (C): polyethylene and/or a propylene-based resin in which a content of propylene units is 40% to 100% by mass;

component (D): an unsaturated silane compound; and
component (E): a peroxide.

[2] The modified elastomer composition according to [1], wherein a content of component (A) is 5 to 70 parts by mass based on 100 parts by mass of a total of component (A) and component (B), wherein a content of component (B) is 95 to 30 parts by mass based on 100 parts by mass of the total of component (A) and component (B), wherein a content of component (C) is 1 to 200 parts by mass based on 100 parts by mass of the total of component (A) and component (B), and wherein a content of component (D) is 0.01 to 3 parts by mass based on 100 parts by mass of the total of component (A) and component (B).

[3] The modified elastomer composition according to [1] or [2], wherein a density of component (B) is 0.880 g/cm³ or less.

[4] The modified elastomer composition according to any of [1] to [3],
wherein an amount of component (E) used is 0.01 to 3 parts by mass based on 100 parts by mass of a total of component (A) and component (B).

[5] The modified elastomer composition according to any of [1] to [4] further comprising component (F): a crosslinking aid in an amount of 0.001 to 2 parts by mass based on 100 parts by mass of a total of component (A) and component (B).

[6] The modified elastomer composition according to any of [1] to [5],
wherein component (D) is a compound represented by following formula (1):

$$RSi(R')_3 \quad (1)$$

where R is an ethylenically unsaturated hydrocarbon group; R's are each independently a hydrocarbon group having 1 to 10 carbon atoms or an alkoxy group having 1 to 10 carbon atoms; and at least one of R's is an alkoxy group having 1 to 10 carbon atoms.

[7] The modified elastomer composition according to any of [1] to [6], further comprising component (G): a softener in an amount of 0.5 to 200 parts by mass based on 100 parts by mass of a total of component (A) and component (B).

[8] The modified elastomer composition according to any of [1] to [7],
wherein component (C) is polyethylene and/or a propylene-based resin in which a content of ethylene units is 0% to 50% by mass.

[9] A crosslinked elastomer composition prepared by subjecting the modified elastomer composition according to any of [1] to [8] to a crosslinking reaction using component (H): a silanol condensation catalyst.

[10] A molded article prepared by molding the modified elastomer composition according to any of [1] to [8] or the crosslinked elastomer composition according to claim 9.

An object of the second invention is to provide a low-gloss modified elastomer composition and a low-gloss crosslinked elastomer composition that exhibit compression set characteristics comparable to those of thermosetting rubbers in the related art and having durability, blocking resistance, and moldability comparable to those of thermoplastic elastomer compositions in the related art and to provide a molded article of the modified elastomer composition or the crosslinked elastomer composition.

The inventors have found that a modified elastomer composition obtained by graft modification of a composition containing an ethylene-α-olefin-non-conjugated diene copolymer rubber, an ethylene-α-olefin copolymer rubber containing no non-conjugated diene units, and an unsaturated silane compound or a crosslinked elastomer composition obtained by subjecting the above modified elastomer composition to a crosslinking reaction can have compression set characteristics comparable to those of thermosetting rubbers and blocking resistance and moldability comparable to those of thermoplastic elastomers. These compression set characteristics, blocking resistance, and moldability have been thought to be impossible to achieve simultaneously. Thus, the second invention has been completed.

The second invention is summarized in the following [11] to [19].

[11] A modified elastomer composition comprising following components (A), (B'), and (D) and grafted with following component (E):
component (A): an ethylene-α-olefin-non-conjugated diene copolymer rubber;
component (B'): an ethylene-α-olefin copolymer rubber whose melting end peak temperature measured using a differential scanning calorimeter (DSC) is 90° C. or higher and which contains no non-conjugated diene units;
component (D): an unsaturated silane compound; and
component (E): a peroxide.

[12] The modified elastomer composition according to [11], wherein a content of component (A) is 5 to 80 parts by mass based on 100 parts by mass of a total of component (A) and component (B'), wherein a content of component (B') is 95 to 20 parts by mass based on 100 parts by mass of the total of component (A) and component (B'), and wherein a content of component (D) is 0.01 to 5 parts by mass based on 100 parts by mass of the total of component (A) and component (B').

[13] The modified elastomer composition according to [11] or [12],
wherein an amount of component (E) used is 0.01 to 3 parts by mass based on 100 parts by mass of a total of component (A) and component (B').

[14] The modified elastomer composition according to any of [11] to [13],
wherein a density of component (B') is 0.880 g/cm³ or less.

[15] The modified elastomer composition according to any of [11] to [14], further comprising component (F): a crosslinking aid in an amount of 0.001 to 2 parts by mass based on 100 parts by mass of a total of component (A) and component (B').

[16] The modified elastomer composition according to any of [11] to [15],
wherein component (D) is a compound represented by following formula (1):

$$RSi(R')_3 \quad (1)$$

where R is an ethylenically unsaturated hydrocarbon group; R's are each independently a hydrocarbon group having 1 to 10 carbon atoms or an alkoxy group having 1 to 10 carbon atoms; and at least one of R's is an alkoxy group having 1 to 10 carbon atoms.

[17] The modified elastomer composition according to any of claims [11] to [16], further comprising component (G): a softener in an amount of 0.5 to 200 parts by mass based on 100 parts by mass of a total of component (A) and component (B').

[18] A crosslinked elastomer composition prepared by subjecting the modified elastomer composition according to any of [11] to [17] to a crosslinking reaction using component (H): a silanol condensation catalyst.

[19] A molded article prepared by molding the modified elastomer composition according to any of [11] to [17] or the crosslinked elastomer composition according to [18].

Advantageous Effects of Invention

The first invention can provide a modified elastomer composition and a crosslinked elastomer composition that are excellent in compression set characteristics and have good durability, good extrusion moldability, and good extrusion-molded appearance and can also provide a molded article using the modified elastomer composition or the crosslinked elastomer composition.

The second invention can provide a low-gloss modified elastomer composition and a low-gloss crosslinked elastomer composition that are excellent in compression set characteristics and have good durability, good blocking resistance, and good moldability and can also provide a molded article using the modified elastomer composition or the crosslinked elastomer composition.

When the modified elastomer composition and crosslinked elastomer composition of the present invention and the molded article using the same are used for applications that use thermosetting rubbers in the related art and require good rubber elasticity, particularly for automobile components such as glass run channels and weather strips, it is expected to obtain products with better quality than products in the related art.

DESCRIPTION OF EMBODIMENTS

Embodiments of the present invention will be described in detail. However, the present invention is not limited to the following description and can be embodied in various modified forms without departing from the scope of the invention.

In the present description, an expression including "to" between numerical values or physical property values is used to indicate a range including these values sandwiching "to."

In the present description, when the term "the present invention" is simply used, the invention includes both the first invention and the second invention and is common to the first invention and the second invention.

[Modified Elastomer Composition and Crosslinked Elastomer Composition of First Invention]

The modified elastomer composition and crosslinked elastomer composition of the first invention will be described hereinafter.

[Modified Elastomer Composition of First Invention]

The modified elastomer composition of the first invention is a modified elastomer composition that contains the following components (A) to (D), has been grafted with the following component (E), and preferably further contains the following components (F) and (G).

Component (A): an ethylene-α-olefin-non-conjugated diene copolymer rubber

Component (B): an ethylene-α-olefin copolymer rubber in which the content of ethylene units is 60% to 99% by mass and which contains no non-conjugated diene units Component (C): polyethylene and/or a propylene-based resin in which the content of propylene units is 40% to 100% by mass Component (D): an unsaturated silane compound Component (E): a peroxide Component (F): a crosslinking aid Component (G): a softener The content of component (A) is preferably 5 to 70 parts by mass based on 100 parts by mass of the total of component (A) and component (B).

The content of component (B) is preferably 95 to 30 parts by mass based on 100 parts by mass of the total of component (A) and component (B).

The content of component (C) is preferably 1 to 200 parts by mass based on 100 parts by mass of the total of component (A) and component (B).

The content of component (D) is preferably 0.01 to 3 parts by mass based on 100 parts by mass of the total of component (A) and component (B).

The content of component (E) used is preferably 0.01 to 3 parts by mass based on 100 parts by mass of the total of component (A) and component (B).

The content of component (F) is preferably 0.001 to 2 parts by mass based on 100 parts by mass of the total of component (A) and component (B).

The content of component (G) is 0.5 to 200 parts by mass based on 100 parts by mass of the total of component (A) and component (B).

[Crosslinked Elastomer Composition of First Invention]

The crosslinked elastomer composition of the first invention is prepared by subjecting the modified elastomer composition of the first invention to a crosslinking reaction using the following component (H).

Component (H): a silanol condensation catalyst

<Mechanism>

The mechanism that allows the modified elastomer composition and crosslinked elastomer composition of the first invention to have excellent compression set characteristics and good durability may be assumed as follows.

The effects of components (D), (E), and (H) and components (E) and (F) cause the degree of crosslinking of components (A) and (B') to increase significantly, and therefore high rubber elasticity can be obtained. Since remaining double bonds are not present, good durability can be obtained.

<Component (A): An Ethylene-α-Olefin-Non-Conjugated Diene Copolymer Rubber>

The ethylene-α-olefin-non-conjugated diene copolymer rubber used as component (A) is a copolymer containing ethylene, α-olefin, and a non-conjugated diene compound as copolymerizable components. Ethylene-α-olefin-non-conjugated diene copolymer rubbers are classified into an oil-extended type that is a mixture of an ethylene-α-olefin-non-conjugated diene copolymer rubber and a hydrocarbon-based rubber softener (hereinafter may be referred to as an oil-extended ethylene-α-olefin-non-conjugated diene copolymer rubber) and a non-oil-extended type containing no hydrocarbon-based rubber softener.

In the present embodiment, the copolymer rubber is of the oil-extended type, but a copolymer rubber of the non-oil-extended type can also be used preferably.

In the present invention, the ethylene-α-olefin-non-conjugated diene copolymer rubber used as component (A) may be either of the oil-extended type or of the non-oil-extended type. Only one ethylene-α-olefin-non-conjugated diene copolymer rubber of the non-oil-extended type or of the oil-extended type may be used alone, or two or more ethylene-α-olefin-non-conjugated diene copolymer rubbers may be used in any combination at any ratio. One or two or more ethylene-α-olefin-non-conjugated diene copolymer rubbers of the oil-extended type and one or two or more ethylene-α-olefin-non-conjugated diene copolymer rubbers of the non-oil-extended type may be used in any combination at any ratio.

When an ethylene-α-olefin-non-conjugated diene copolymer rubber of the oil-extended type is used, the hydrocarbon-based rubber softener contained in the mixture is classified as the softener used as component (G).

The hydrocarbon-based rubber softener contained in the ethylene-α-olefin-non-conjugated diene copolymer rubber of the oil-extended type may be one of materials exemplified as component (F) described later. In the mixture of the ethylene-α-olefin-non-conjugated diene copolymer rubber of the oil-extended type and the hydrocarbon-based rubber softener, the ratio (an extender oil content) of the hydrocarbon-based rubber softener relative to 100 parts by mass of the ethylene-α-olefin-non-conjugated diene copolymer rubber of the oil-extended type is generally about 10 to about 200 parts by mass.

The α-olefin in component (A) is an α-olefin having preferably 3 to 20 carbon atoms and more preferably 3 to 8 carbon atoms such as propylene, 1-butene, 3-methyl-1-butene, 1-pentene, 4-methyl-1-pentene, 4,4-dimethyl-1-pentene, 1-hexene, 4-methyl-1-hexene, 1-heptene, 1-octene, 1-decene, or 1-octadecene but is not limited thereto. Of these, from the viewpoint of crosslinkability and prevention of blooming etc., propylene, 1-butene, 3-methyl-1-butene, and 1-pentene are preferred, and propylene and 1-butene are more preferred. Only one α-olefin may be used alone, or two or more α-olefins may be used in any combination at any ratio.

Examples of the non-conjugated diene compound in component (A) include, but not particularly limited to, dicyclopentadiene, 1,4-hexadiene, cyclohexadiene, cyclooctadiene, dicyclooctadiene, 1,6-octadiene, 5-methyl-1,4-hexadiene, 3,7-dimethyl-1,6-octadiene, 1,3-cyclopentadiene, 1,4-cyclohexadiene, 2-methyl-1,5-hexadiene, 6-methyl-1,5-heptadiene, 7-methyl-1,6-octadiene, tetrahydroindene, methyltetrahydroindene, 5-isopropylidene-2-norbornene, 5-vinyl-2-norbornene, vinylidenenorbornene, ethylidenenorbornene such as 5-ethylidene-2-norbornene (ENB), and methylenenorbornene such as 5-methylene-2-norbornene (MNB). Of these, from the viewpoint of crosslinkability etc., dicyclopentadiene, ethylidenenorbornene, and vinylidenenorbornene are preferred, and dicyclopentadiene, 5-ethylidene-2-norbornene, and vinylidenenorbornene are more preferred. Only one non-conjugated diene may be used alone, or two or more non-conjugated dienes may be used in any combination at any ratio.

Specific examples of the ethylene-α-olefin-non-conjugated diene copolymer rubber include, but not particularly limited to: ethylene-propylene-non-conjugated diene copolymer rubbers (EPDMs) such as ethylene-propylene-5-ethylidene-2-norbornene copolymer rubber, ethylene-propylene-dicyclopentadiene copolymer rubber, ethylene propylene-1,4-hexadiene copolymer rubber, and ethylene propylene-5-vinyl-2-norbornene copolymer rubber; and ethylene-1-butene-5-ethylidene-2-norbornene copolymer rubber. Of these, from the viewpoint of crosslinkability, prevention of blooming, etc., ethylene-propylene-non-conjugated diene copolymer rubbers (EPDMs) are preferred. Only one ethylene-α-olefin-non-conjugated diene copolymer rubber may be used alone, or two or more ethylene-α-olefin-non-conjugated diene copolymer rubbers may be used in any combination at any ratio.

No particular limitation is imposed on the content of ethylene units in the ethylene-α-olefin-non-conjugated diene copolymer rubber, but the content of ethylene units is preferably 50% to 90% by mass, more preferably 55% to 85% by mass, and still more preferably 60% to 80% by mass. When the content of ethylene units is within the above preferred range, the elastomer composition obtained tends to be excellent in mechanical strength and rubber elasticity.

No particular limitation is imposed on the content of α-olefin units in the ethylene-α-olefin-non-conjugated diene copolymer rubber, but the content of α-olefin units is preferably 10% to 50% by mass, more preferably 15% to 45% by mass, and still more preferably 20% to 40% by mass. When the content of α-olefin units is within the above preferred range, the elastomer composition obtained tends to be excellent in mechanical strength and rubber elasticity and have suitable flexibility.

No particular limitation is imposed on the content of non-conjugated diene units in the ethylene-α-olefin-non-conjugated diene copolymer rubber, but the content of non-conjugated diene units is preferably 0.5% to 30% by mass, more preferably 1% to 20% by mass, and still more preferably 2% to 10% by mass. When the content of non-conjugated diene units is within the above preferred range, crosslinkability and moldability can be easily adjusted, and the elastomer composition obtained tends to be excellent in mechanical strength and rubber elasticity.

The contents of structural units in component (A), component (B') such as component (B) described later, and component (C) can be determined by infrared spectroscopy.

Component (A) is particularly preferably an ethylene-propylene-non-conjugated diene copolymer rubber copolymer in which the content of ethylene units is 55% to 75% by mass, the content of propylene units is 15% to 40% by mass, and the content of at least one type of non-conjugated diene units selected from the group consisting of dicyclopentadiene units, 5-ethylidene-2-norbornene units, and vinylidenenorbornene units is 1% to 10% by mass.

Only one ethylene-α-olefin-non-conjugated diene copolymer rubber used as component (A) may be used alone, or two or more ethylene-α-olefin-non-conjugated diene copolymer rubbers may be used in any combination at any ratio.

<Component (B): Ethylene-α-Olefin Copolymer>

The ethylene-α-olefin copolymer used as component (B) is an ethylene-α-olefin copolymer in which the content of ethylene units is 60% to 99% by mass and which contains no non-conjugated diene units, i.e., is an ethylene-α-olefin copolymer excluding component (A). No particular limitation is imposed on the type of ethylene-α-olefin copolymer used as component (B) so long as it meets the above requirements, and a suitable well-known ethylene-α-olefin copolymer is used.

Specific examples of the ethylene-α-olefin copolymer include copolymers of ethylene and one or two or more α-olefins having 3 to 10 carbon atoms such as an ethylene-propylene copolymer, an ethylene-1-butene copolymer, an ethylene-4-methyl-1-pentene copolymer, an ethylene-1-hexene copolymer, and an ethylene-1-octene copolymer.

No particular limitation is imposed on the type of catalyst used when the ethylene-α-olefin copolymer is produced. Examples of the catalyst include a Ziegler-Natta catalyst and a metallocene catalyst. Preferably, the ethylene-α-olefin copolymer is produced using the metallocene catalyst.

Preferably, the melting end peak temperature (hereinafter may be referred to as a "melting end point") of the ethylene-α-olefin copolymer used as component (B) that is measured using a differential scanning calorimeter (DSC) is 115° C. or higher. When the melting end point of the ethylene-α-olefin copolymer is 115° C. or higher, the shape can be maintained by the crystals of the ethylene-α-olefin copolymer even at high temperature. From this point of view, the melting end point of the ethylene-α-olefin copolymer is preferably 115° C. or higher. If the melting end point of the ethylene-α-olefin copolymer is excessively high, it is feared that deterioration in appearance may occur because of non-melted particles during heating for molding and premature crystallization (melt fracture) during cooling for molding. Therefore, the melting end point of the ethylene-α-olefin copolymer is generally 145° C. or lower. The melting end point of the ethylene-α-olefin copolymer is measured by a method described in Examples described later.

The density of the ethylene-α-olefin copolymer used as component (B) (measured according to JIS K6922-1,2: 1997) is preferably 0.850 to 0.910 g/cm$^3$, more preferably 0.860 to 0.900 g/cm$^3$, and still more preferably 0.860 to 0.880 g/cm$^3$. When the density is equal to or less than the above upper limit, the ethylene-α-olefin copolymer tends to be soft and excellent in sealing performance. When the density is equal to or higher than the above lower limit, the shape can be maintained at room temperature, and hysteresis loss is small. Therefore, permanent set (compression set) tends to be excellent.

The content of ethylene units in the ethylene-α-olefin copolymer used as component (B) is 60% to 99% by mass and preferably 60% to 85% by mass. When the content of ethylene units is within the above range, the elastomer composition obtained tends to be excellent in mechanical strength and rubber elasticity.

The melt flow rate (MFR) of the ethylene-α-olefin copolymer used as component (B) that is measured according to JIS K7210 (1999) under the conditions of a temperature of 190° C. and a load of 21.2 N is preferably 0.01 to 30 g/10 minutes. If the MFR is excessively high, the compression set is large, and the sealing performance may deteriorate. If the MFR is excessively small, the load on a motor during modification extrusion is large, and the pressure of resin increases. In this case, productivity may deteriorate, and the surface of a molded product may be roughened. From these points of view, the MFR of the ethylene-α-olefin copolymer is more preferably from 0.1 g/10 minutes to 10 g/10 minutes inclusive.

The ethylene-α-olefin copolymer used in the present invention can be obtained as a commercial product. For example, a suitable one selected from ENGAGE (registered trademark) series manufactured by the Dow Chemical Company, KERNEL (registered trademark) series manufactured by Japan Polyethylene Corporation, INFUSE (registered trademark) series manufactured by the Dow Chemical Company, TAFMER (registered trademark) series manufactured by Mitsui Chemicals, Inc., and EVOLUE (registered trademark) series manufactured by Mitsui Chemicals, Inc. can be used.

Only one ethylene-α-olefin copolymer used as component (B) may be used alone, or two or more ethylene-α-olefin copolymers may be used in any combination at any ratio.
<Component (C): Polyethylene and/or Propylene-Based Resin>

Component (C) is polyethylene and/or a propylene-based resin in which the content of propylene units is 40% to 100% by mass. Component (C) contributes to moldability.

Only one polyethylene may be used as component (C), or two or more polyethylenes with different physical properties may be used. Only one propylene-based resin may be used, or two or more propylene-based resins with different compositions or different physical properties may be used. One or two or more polyethylenes and one or two or more propylene-based resins may be used in combination.

In component (C), the polyethylene (ethylene homopolymer) used is preferably one or two or more selected from high-density polyethylene (low-pressure polyethylene), low-density polyethylene (high-pressure polyethylene), linear low-density polyethylene, etc. High-density polyethylene is particularly preferable.

The density (JIS K6922-1,2) of the polyethylene is preferably 0.91 to 0.97 g/cm$^3$ and more preferably 0.94 to 0.97 g/cm$^3$. If the density is less than 0.91 g/cm$^3$, the melting point of the composition may decrease, and its heat deformation temperature may decrease. It is generally difficult to produce a composition having a density of more than 0.97 g/cm$^3$.

The melt flow rate (MFR) of the polyethylene used as component (C) that is measured at 190° C. and a load of 21.2 N according to JIS K 7210 (1999) is generally 0.01 g/10 minutes or more. From the viewpoint of flowability, the melt flow rate is preferably 0.05 g/10 minutes or more and more preferably 0.1 g/10 minutes or more. The melt flow rate is generally 50 g/10 minutes or less. From the viewpoint of moldability, the melt flow rate is preferably 40 g/10 minutes or less and more preferably 20 g/10 minutes or less.

In the propylene-based resin in component (C), the content of propylene units is 40% to 100% by mass based on the total mass of monomer units contained in the propylene-based resin. Preferably, the content of ethylene units in the propylene-based resin is 0% to 50% by mass.

No particular limitation is imposed on the type of propylene-based resin in component (C). Any of a propylene homopolymer, a propylene random copolymer, a propylene block copolymer, etc. may be used. One of them may be used, or a combination of two or more may be used.

When component (C) is a propylene random copolymer or a propylene block copolymer, a monomer copolymerized with propylene is one or two or more α-olefins such as ethylene, 1-butene, 2-methylpropylene, 1-pentene, 3-methyl-1-butene, 1-hexene, 4-methyl-1-pentene, and 1-octene. When component (C) is a propylene block copolymer, the propylene block copolymer may be obtained by multistage polymerization. More specifically, the propylene block copolymer may be obtained, for example, by polymerizing polypropylene in a first stage and polymerizing a propylene-ethylene copolymer in a second stage.

In the polypropylene-based resin in component (C), the content of propylene units is 40% by mass or more and preferably 50% by mass or more. When the content of propylene units is equal to or higher than the above lower limit, moldability and molded appearance tend to be good. No particular limitation is imposed on the upper limit of the content of propylene units, and the upper limit is generally 100% by mass.

The melt flow rate (MFR) of the propylene-based resin in component (C) that is measured according to JIS K 7210 (1999) at 230° C. and a load of 21.2 N is generally 0.01 g/10 minutes or more. From the viewpoint of flowability, the melt flow rate is preferably 0.05 g/10 minutes or more, more preferably 0.1 g/10 minutes or more, and still more preferably 0.5 g/10 minutes or more. The melt flow rate is generally 200 g/10 minutes or less. From the viewpoint of moldability, the melt flow rate is preferably 100 g/10 minutes or less, more preferably 70 g/10 minutes or less, and still more preferably 50 g/10 minutes or less.

A commercial product may be used as the polyethylene in component (C). Examples of the commercial polyethylene include NOVATEC (registered trademark) HD available from Japan Polyethylene Corporation, HI-ZEX (registered trademark) available from Prime Polymer Co., Ltd., and SUMIKATHENE (registered trademark) available from Sumitomo Chemical Co., Ltd., and a suitable product may be selected.

A commercial product may be used as the propylene-based resin in component (C). A commercial propylene-based resin is available from any of the following manufacturers, and a suitable product may be selected. Examples of the available commercial product include Prim Polypro (registered trademark) available from Prime Polymer Co., Ltd., SUMITOMO NOBLEN (registered trademark) available from Sumitomo Chemical Co., Ltd., a polypropylene block copolymer available from SunAllomer Ltd., NOVATEC (registered trademark) PP available from Japan Polypropylene Corporation, Moplen (registered trademark), Adflex, Hiflex, and Hifax available from LyondellBasell, ExxonMobil PP available from ExxonMobil, Formolene (registered trademark) available from Formosa Plastics, Borealis PP available from Borealis, SEETEC PP available from LG Chemical, ASI POLYPROPYLENE available from A. Schulman, INEOS PP available from INEOS Olefins & Polymers, Braskem PP available from Braskem, Sumsung Total available from SAMSUNG TOTAL PETROCHEMICALS, Sabic (registered trademark) PP available from Sabic, TOTAL PETROCHEMICALS Polypropylene available from TOTAL PETROCHEMICALS, YUPLENE (registered trademark) available from SK, and Tefabloc available from Mitsubishi Chemical Corporation.

<Component (D): Unsaturated Silane Compound>

No particular limitation is imposed on the unsaturated silane compound used as component (D) in the present invention. However, an unsaturated silane compound represented by the following formula (1) is preferably used.

$$RSi(R')_3 \quad (1)$$

In formula (1), R is an ethylenically unsaturated hydrocarbon group. R's are each independently a hydrocarbon group having 1 to 10 carbon atoms or an alkoxy group having 1 to 10 carbon atoms, and at least one of R's is an alkoxy group having 1 to 10 carbon atoms.

In formula (1), R is preferably an ethylenically unsaturated hydrocarbon group having 2 to 10 carbon atoms and more preferably an ethylenically unsaturated hydrocarbon group having 2 to 6 carbon atoms. Specific examples include alkenyl groups such as a vinyl group, a propenyl group, a butenyl group, and a cyclohexenyl group.

In formula (1), R's are each preferably a hydrocarbon group having 1 to 6 carbon atoms or an alkoxy group having 1 to 6 carbon atoms and more preferably a hydrocarbon group having 1 to 4 carbon atoms or an alkoxy group having 1 to 4 carbon atoms. At least one of R's is preferably an alkoxy group having 1 to 6 carbon atoms and more preferably an alkoxy group having 1 to 4 carbon atoms. The hydrocarbon group having 1 to 10 carbon atoms that is used for R's may be any of aliphatic groups, alicyclic groups, and aromatic groups and is desirably an aliphatic group. The alkoxy group having 1 to 10 carbon atoms that is used for R's may be linear, branched, or cyclic and is preferably linear or branched. When each R' is a hydrocarbon group, specific examples thereof include alkyl groups typified by a methyl group, an ethyl group, an isopropyl group, a t-butyl group, an n-butyl group, an i-butyl group, and a cyclohexyl group and aryl groups typified by a phenyl group. When each R' is an alkoxy group, specific examples thereof include a methoxy group, an ethoxy group, an isopropoxy group, and a β-methoxyethoxy group.

When the unsaturated silane compound is represented by formula (1), at least one of the three R's is an alkoxy group. Preferably, two of the R's are each an alkoxy group. More preferably, all the R's are each an alkoxy group.

Among the unsaturated silane compounds represented by formula (1), vinyltrialkoxysilanes typified by vinyltrimethoxysilane, vinyltriethoxysilane, and propenyltrimethoxysilane are desirable. This is because the vinyl group allows modification to the ethylene-α-olefin copolymer used as component (B) (component (B') in the second invention described later) and the alkoxy groups allow a crosslinking reaction described later to proceed. Alkoxy groups introduced into the ethylene-α-olefin copolymer by graft modification using the unsaturated silane compound react with water in the presence of the silanol condensation catalyst to generate silanol groups by hydrolysis. Then the silanol groups undergo dehydration condensation. Ethylene-α-olefin copolymer molecules are thereby bonded to each other, and the crosslinking reaction occurs. Only one unsaturated silane compound may be used alone, or a combination of two or more may be used.

<Component (E): Peroxide>

Examples of the peroxide used as component (E) include organic peroxides included in hydroperoxides, dialkyl peroxides, diacyl peroxides, peroxyesters, and ketone peroxides. Specific examples are as follows.

The hydroperoxides include cumene hydroperoxide, tert-butyl hydroperoxide, etc.

The dialkyl peroxides include dicumyl peroxide, di-tert-butyl peroxide, 2,5-dimethyl-2,5-di-tert-butylperoxyhexane, 2,5-dimethyl-2,5-di-tert-butylperoxyhexyne-3, di(2-tert-butylperoxyisopropyl)benzene, etc.

The diacyl peroxides include lauryl peroxide, benzoyl peroxide, etc.

The peroxyesters include tert-peroxyacetate, tert-butyl peroxybenzoate, tert-butylperoxy isopropyl carbonate, etc.

The ketone peroxides include cyclohexanone peroxide etc.

Only one of these organic peroxides may be used alone, or a combination of two or more may be used.

When the peroxide is used in combination with the crosslinking aid used as component (F) described later, a radical generator having high thermal decomposition temperature is preferred. From this point of view, di-tert-butyl peroxide, di(2-tert-butylperoxyisopropyl)benzene, 2,5-dimethyl-2,5-di(t-butylperoxy)hexane, and dicumyl peroxide are preferred.

<Component (F): Crosslinking Aid>

Examples of the crosslinking aid used as component (F) include: aids for peroxides such as silicon hydride compounds including methyl hydrogen silicon etc., sulfur, p-quinonedioxime, p-dinitrosobenzene, and 1,3-diphenylguanidine; polyfunctional vinyl compounds such as divinylbenzene, triallyl cyanurate, triallyl isocyanurate, and diallyl phthalate; polyfunctional (meth)acrylate compounds such as ethylene glycol di(meth)acrylate, diethylene glycol di(meth)acrylate, polyethylene glycol di(meth)acrylate, trimethylolpropane tri(meth)acrylate, and allyl (meth)acrylate; compounds having a bismaleimide structure such as N,N'-m-phenylene bismaleimide and N,N'-m-toluylene bismaleimide; trimethylolpropane; trimethylolpropane trimethacrylate; and tin chloride ($SnCl_2$). Of these, polyfunctional vinyl compounds such as divinylbenzene, triallyl cyanurate, triallyl isocyanurate, and diallyl phthalate and polyfunctional (meth)acrylate compounds are preferred.

Moreover, a phenolic resin may also be used as the crosslinking aid. Examples of the phenolic resin include alkyl phenol formaldehyde and alkyl bromide phenol formaldehyde.

Only one of these crosslinking aids may be used alone, or two or more of them may be used in any combination at any ratio.

<Component (G): Softener>

From the viewpoint of increasing flexibility and improving workability, flowability, and oil resistance, the modified elastomer composition of the present invention may contain a softener as component (G).

Examples of component (G) include mineral oil-based rubber softeners and synthetic resin-based rubber softeners. Of these, mineral oil-based rubber softeners are preferred from the viewpoint of compatibility with other components etc.

Generally, a mineral oil-based rubber softener is a mixture of an aromatic hydrocarbon, a naphthenic hydrocarbon, and a paraffinic hydrocarbon. A mineral oil-based rubber softener in which the ratio of the mass of carbon atoms in the paraffinic hydrocarbon to the total mass of carbon atoms in the softener is 50% by mass or more is called a paraffinic oil. A mineral oil-based rubber softener in which the ratio of the mass of carbon atoms in the naphthenic hydrocarbon to the total mass of carbon atoms in the softener is 30% to 45% by mass is called a naphthenic oil. A mineral oil-based rubber softener in which the ratio of the mass of carbon atoms in the aromatic hydrocarbon to the total mass of carbon atoms in the softener is 35% by mass or more is called an aromatic oil. Of these, a liquid hydrocarbon-based rubber softener that is in the form of liquid at room temperature (23±2° C.) is preferred as the above softener, and a liquid paraffinic oil that is in the form of liquid at room temperature is more preferred.

When the softener used is a liquid hydrocarbon-based rubber softener, the flexibility and elasticity of the modified elastomer composition of the present invention can be increased, and the workability and flowability tend to be significantly improved.

No particular limitation is imposed on the paraffinic oil. The kinematic viscosity of the paraffinic oil at 40° C. is generally 10 cSt (centistokes) or more and preferably 20 cSt or more and is generally 800 cSt or less and preferably 600 cSt or less. A paraffinic oil having a pour point of typically −40° C. or higher and preferably −30° C. or higher and 0° C. or lower is preferably used. A paraffinic oil having a flash point (COC) of typically 200° C. or higher and preferably 250° C. or higher and typically 400° C. or lower and preferably 350° C. or lower is preferably used.

Only one softener used as component (G) may be used alone, or two or more softeners may be used in any combination at any ratio.

When component (A) used is of the oil-extended type, the hydrocarbon-based rubber softener introduced into the elastomer composition in the form of a mixture of the ethylene-α-olefin-non-conjugated diene copolymer rubber of the oil-extended type and the hydrocarbon-based rubber softener also corresponds to the softener used as component (G). In this case, the softener may be added separately as component (G), or an additional softener added separately may be used. When the additional softener is added separately, the hydrocarbon-based rubber softener contained in component (A) of the oil-extended type may be the same as the additional softener or may be different therefrom.

<Component (H): Silanol Condensation Catalyst>

By adding the silanol condensation catalyst used as component (H) to the modified elastomer composition of the present invention, the molecules of the composition can undergo a crosslinking reaction. In this case, as described above, alkoxy groups introduced into component (A) and component (B) by graft modification using the unsaturated silane compound used as component (D) react with water in the presence of the silanol condensation catalyst used as component (H) to generate silanol groups by hydrolysis. Then the silanol groups undergo dehydration condensation, and the crosslinking reaction proceeds. Modified elastomer molecules are thereby bonded to each other, and a crosslinked elastomer composition having excellent heat resistance is generated.

The silanol condensation catalyst used as component (H) is, for example, at least one compound selected from the group consisting of metal organic acid salts, titanates, borates, organic amines, ammonium salts, phosphonium salts, inorganic and organic acids, and inorganic acid esters.

Examples of the metal organic acid salts include dibutyltin dilaurate, dioctyltin dilaurate, dibutyltin diacetate, dibutyltin dioctoate, stannous acetate, stannous octoate, cobalt naphthenate, lead octylate, lead naphthenate, zinc octylate, zinc caprylate, iron 2-ethylhexanoate, iron octylate, and iron stearate.

Examples of the titanates include titanic acid tetrabutyl ester, titanic acid tetranonyl ester, and bis(acetylacetonitrile) di-isopropyl titanate.

Examples of the organic amines include ethylamine, dibutylamine, hexylamine, triethanolamine, dimethylsoyaamine, tetramethylguanidine, and pyridine.

Examples of the ammonium salts include ammonium carbonate and tetramethylammonium hydroxide. Examples of the phosphonium salts include tetramethylphosphonium hydroxide.

Examples of the inorganic and organic acids include sulfuric acid, hydrochloric acid, acetic acid, stearic acid, maleic acid, and sulfonic acids such as toluenesulfonic acid and alkylnaphthylsulfonic acids.

Examples of the inorganic acid esters include phosphoric acid esters.

Of these, the metal organic acid salts, sulfonic acids, and phosphoric acid esters are preferred, and metal carboxylates of tin such as dioctyltin dilaurate, alkylnaphthylsulfonic acids, and ethylhexyl phosphate are more preferred.

Only one silanol condensation catalyst may be used, or a combination of two or more may be used.

Preferably, the silanol condensation catalyst is used in the form of a masterbatch containing polyolefin and the silanol condensation catalyst. Examples of the polyolefin that can be used for the masterbatch include polyethylene, polypropylene, and an ethylene-α-olefin copolymer.

Examples of the polyethylene include: (branched or linear) ethylene homopolymers such as low, medium, high density polyethylenes; ethylene-α-olefin copolymers such as an ethylene-propylene copolymer, an ethylene-1-butene copolymer, an ethylene-4-methyl-1-pentene copolymer, an ethylene-1-hexene copolymer, and an ethylene-1-octene copolymer; and ethylene-based copolymer resins such as an ethylene-vinyl acetate copolymer, an ethylene-(meth)acrylic acid copolymer, and an ethylene-(meth)acrylate copolymer. Of these, ethylene-α-olefin copolymers such as an ethylene-propylene copolymer, an ethylene-1-butene copolymer, an ethylene-4-methyl-1-pentene copolymer, an ethylene-1-hexene copolymer, and an ethylene-1-octene copolymer are preferred.

In the present invention, high-pressure low-density polyethylenes, high-density polyethylenes, and ethylene-α-olefin copolymers that are well balanced between heat resistance and strength are preferred. The ethylene-α-olefin copolymer is more preferably an ethylene-α-olefin copolymer such as an ethylene-1-butene copolymer, an ethylene-4-methyl-1-pentene copolymer, an ethylene-1-hexene copolymer, or an ethylene-1-octene copolymer. The ethylene-α-olefin copolymer is more preferably a copolymer obtained by copolymerizing 2% to 60% by mass of one or two or more α-olefins and 40% to 98% by mass of ethylene.

In the masterbatch containing the silanol condensation catalyst, only one of these polyolefins may be used, or a mixture of two or more may be used.

When the silanol condensation catalyst is used in the form of a masterbatch containing the polyolefin and the silanol condensation catalyst, no particular limitation is imposed on the content of the silanol condensation catalyst in the masterbatch. Generally, the content is preferably about 0.1% to 5.0% by mass.

A commercial product may be used as the masterbatch containing the silanol condensation catalyst. For example, "LZ082" and "LZ033" manufactured by Mitsubishi Chemical Corporation can be used.

<Mixing Ratio>

Preferably, the modified elastomer composition of the first invention contains component (A) in an amount of 5 to 70 parts by mass and component (B) in an amount of 95 to 30 parts by mass such that the sum of these amounts is 100 parts by mass. If the content of component (A) is larger than the above upper limit and the content of component (B) is lower than the above lower limit, a good appearance tends not to be obtained. If the content of component (A) is lower than the above lower limit and the content of component (B) is larger than the above upper limit, gloss tends to increase, and blocking tends to occur. From these points of view, the ratio of component (A) relative to 100 parts by mass of the total of component (A) and component (B) is more preferably 5 to 70 parts by mass and still more preferably 5 to 50 parts by mass, and the ratio of component (B) is more preferably 95 to 30 parts by mass and still more preferably 95 to 50 parts by mass.

From the viewpoint of maintaining smooth molded appearance and flexibility, the content of component (C) is preferably 1 to 200 parts by mass, more preferably 5 to 80 parts by mass, and still more preferably 10 to 50 parts by mass based on 100 parts by mass of the total of component (A) and component (B).

From the viewpoint of allowing the crosslinking reaction to proceed sufficiently, the content of component (D) is preferably 0.01 to 5 parts by mass, more preferably 0.05 to 5 parts by mass, and still more preferably 0.1 to 3 parts by mass based on 100 parts by mass of the total of component (A) and component (B).

The content of component (E) is preferably 0.01 to 3 parts by mass based on 100 parts by mass of the total of component (A) and component (B). From the viewpoint of obtaining a sufficient crosslinking reaction and maintaining a smooth molded appearance, the content of component (E) is more preferably 0.05 to 2 parts by mass and still more preferably 0.1 to 1 part by mass.

When the modified elastomer composition of the first invention contains component (F), the content of component (F) is 0.001 to 2 parts by mass based on 100 parts by mass of the total of component (A) and component (B). From the viewpoint of economic efficiency and obtaining a sufficient crosslinking reaction, the content of component (F) is preferably 0.003 to 1 part by mass.

When the modified elastomer composition of the first invention contains component (G), the content of component (G) (including the hydrocarbon-based rubber softener in component (A) when component (A) used is of the oil-extended type) is 0.5 to 200 parts by mass based on 100 parts by mass of the total of component (A) and component (B). If the content of component (G) is less than the above lower limit, the effects of improving the flexibility, flowability, and oil resistance by component (G) are insufficient. If the content of component (G) exceeds the above upper limit, it is feared that bleeding of component (G) on the surface may occur. From this point of view, the content of component (G) is preferably 1 to 100 parts by mass and more preferably 5 to 80 parts by mass based on 100 parts by mass of the total of component (A) and component (B).

When the silanol condensation catalyst used as component (H) is added to the modified elastomer composition of the first invention to allow the crosslinking reaction to proceed, no particular limitation is imposed on the amount of the silanol condensation catalyst added. The amount of the silanol condensation catalyst added is preferably 0.001 to 0.5 parts by mass and more preferably 0.001 to 0.1 parts by mass based on 100 parts by mass of the modified elastomer composition of the first invention excluding component (H). It is preferable that the amount of the silanol condensation catalyst added is equal to or more than the above lower limit because the crosslinking reaction proceeds sufficiently and the heat resistance tends to be good. It is preferable that the amount of the silanol condensation catalyst added is equal to or lower than the upper limit because premature crosslinking is unlikely to occur in an extruder and the surface of a strand and the appearance of products tend not to be roughened.

<Additional Components>

The modified elastomer composition of the present invention may contain, in addition to the above components, additional components such as various additives, fillers, resins and elastomers other than components (A) to (C) etc. so long as the effects of the invention are not impaired.

Examples of the additives include a thermal stabilizer, an ultraviolet absorber, a light stabilizer, an antioxidant, an antistatic agent, a nucleating agent, an anticorrosive, a viscosity modifier, a blowing agent, a lubricant, and a pigment. Of these, an antioxidant, particularly a phenol-based antioxidant, a sulfur-based antioxidant, or a phosphorus-based antioxidant, is preferably contained.

Preferably, the antioxidant is contained in an amount of 0.1% to 1% by mass based on 100% by mass of the modified elastomer composition of the present invention.

Examples of the additional resins include polyolefin resins other than component (C), polyester resins, polycarbonate resins, polymethyl methacrylate resins, rosin and derivatives thereof, terpene resins and petroleum resin and derivatives thereof, alkyd resins, alkylphenol resins, terpenephenol resins, coumarone-indene resins, synthesized terpene resins, alkylene resins, olefin-based elastomers other than components (A) and (B), polyamide-based elastomers such as polyamide-polyol copolymers; polyvinyl chloride-based elastomers, polybutadiene-based elastomers, styrene-based elastomers, hydrogenated products of these elastomers, products obtained by modifying these elastomers with acid anhydrides, etc. to introduce polar functional groups, and copolymers obtained by graft, random, and/or block copolymerization with an additional monomer.

<Production and Molding of Modified Elastomer Composition>

The modified elastomer composition of the first invention can be produced by mechanically mixing components (A) to (C), the unsaturated silane compound used as component (D), the peroxide used as component (E), an optional crosslinking aid, an optional softener, and other optional components using a well-known method such as a Henschel mixer, a V blender, or a tumbler blender and then mechanically melting and kneading them using a well-known method. The melting and kneading can be performed using a general melt kneader such as a Banbury mixer, any of various kneaders, a single or twin screw extruder. When the composition of the present invention is produced by kneading using, for example, a single or twin screw extruder, the melting and kneading may be performed under heating to generally 120° C. to 240° C. and preferably 120° C. to 220° C., as indicated in Examples described later.

A crosslinked elastomer composition can be obtained as follows. The above-described silanol condensation catalyst is mixed with the modified elastomer composition of the present invention, and the mixture is molded using any of various molding methods such as extrusion molding, injection molding, and press forming. The product is then exposed to a water environment to allow a crosslinking reaction between silanol groups to proceed. Various conditions can be employed for the method of exposing the product to the water environment, and examples of the method include a method in which the product is left to stand in air containing moisture, a method in which air containing water vapor is sent, a method in which the product is immersed in a water bath, and a method in which warm water mist is sprayed.

In this case, hydrolysable alkoxy groups originating from the unsaturated silane compound used for graft modification of components (A) and (B) react with water in the presence of the silanol condensation catalyst, and silanol groups are generated by hydrolysis. Then the silanol groups undergo dehydration condensation, and the crosslinking reaction proceeds. Modified elastomer molecules are thereby bonded to each other, and a crosslinked elastomer composition is generated.

The rate of progress of the crosslinking reaction is determined by the conditions for exposure to the water environment. Generally, the exposure is performed in the temperature range of 0° C. to 130° C. and the time range of 5 minutes to 1 week. In particularly preferable conditions, the temperature range is 40° C. to 90° C., and the time range is 30 minutes to 24 hours. When air containing moisture is used, the relative humidity is selected within the range of 1% to 100%.

The degree of crosslinking of the thus-obtained crosslinked elastomer composition can be adjusted by changing the type and mixing amount of the silanol condensation catalyst, the crosslinking conditions (temperature and time) etc.

[Modified Elastomer Composition and Crosslinked Elastomer Composition of Second Invention]

The modified elastomer composition and crosslinked elastomer composition of the second invention will be described.

[Modified Elastomer Composition of Second Invention]

The modified elastomer composition of the second invention is a modified elastomer composition that contains the following components (A), (B'), and (D), has been grafted with the following component (E) and preferably further contains the following components (F) to (G).

Component (A): an ethylene-α-olefin-non-conjugated diene copolymer rubber

Component (B'): an ethylene-α-olefin copolymer rubber whose melting end peak temperature measured using a differential scanning calorimeter (DSC) is 90° C. or higher and which contains no non-conjugated diene units Component (D): an unsaturated silane compound Component (E): a peroxide Component (F): a crosslinking aid Component (G): a softener The content of component (A) is preferably 5 to 80 parts by mass based on 100 parts by mass of the total of component (A) and component (B').

The content of component (B') is preferably 95 to 20 parts by mass based on 100 parts by mass of the total of component (A) and component (B').

The content of component (D) is preferably 0.01 to 5 parts by mass based on 100 parts by mass of the total of component (A) and component (B').

The content of component (E) used is preferably 0.01 to 3 parts by mass based on 100 parts by mass of the total of component (A) and component (B').

The content of component (F) is preferably 0.001 to 2 parts by mass based on 100 parts by mass of the total of component (A) and component (B').

The content of component (G) is preferably 0.5 to 200 parts by mass based on 100 parts by mass of the total of component (A) and component (B').

[Crosslinked Elastomer Composition of Second Invention]

The crosslinked elastomer composition of the second invention is formed by subjecting the modified elastomer composition of the second invention to a crosslinking reaction using the following component (H).

Component (H): a silanol condensation catalyst

<Mechanism>

The mechanism that allows the modified elastomer composition and crosslinked elastomer composition of the second invention to have excellent compression set characteristics, good durability, good blocking resistance, and low gloss may be assumed as follows.

The effects of components (D), (E), and (H) and component (F) cause the degree of crosslinking of components (A) and (B') to increase significantly, and therefore high rubber elasticity can be obtained. Since component (A) is finely dispersed in component (B'), diffuse reflection occurs, and therefore low gloss is obtained. In addition, the effect of preventing blocking is obtained. Since no remaining double bonds are present, good durability can be obtained.

<Component (A): Ethylene-α-Olefin-Non-Conjugated Diene Copolymer Rubber>

The ethylene-α-olefin-non-conjugated diene copolymer rubber used as component (A) in the second invention can be the same as the ethylene-α-olefin-non-conjugated diene copolymer rubber used as component (A) in the first invention. The operational advantages and preferred modes of compound (A) in the second invention are the same as those in the first invention. Therefore, the description of component (A) in the first invention is applied to component (A) in the second invention without any changes.

<Component (B'): Ethylene-α-Olefin Copolymer>

The ethylene-α-olefin copolymer used as component (B') in the second invention is a copolymer whose melting end peak temperature (melting end point) measured using a differential scanning calorimeter (DSC) is 90° C. or higher and which contains ethylene units and α-olefin units and contains no non-conjugated diene units, i.e., is an ethylene-α-olefin copolymer excluding component (A). No particular limitation is imposed on the type of ethylene-α-olefin copolymer used as component (B') so long as it meets the above requirements, and a suitable well-known ethylene-α-olefin copolymer is used.

Specific examples of the ethylene-α-olefin copolymer used as component (B') include copolymers of ethylene and one or two or more α-olefins having 3 to 10 carbon atoms such as an ethylene-propylene copolymer, an ethylene-1-butene copolymer, an ethylene-4-methyl-1-pentene copolymer, an ethylene-1-hexene copolymer, and an ethylene-1-octene copolymer.

No particular limitation is imposed on the type of catalyst used when the ethylene-α-olefin copolymer used as component (B') is produced. Examples of the catalyst include a Ziegler-Natta catalyst and a metallocene catalyst. Preferably, the ethylene-α-olefin copolymer is produced using the metallocene catalyst.

The melting end point of the ethylene-α-olefin copolymer used as component (B') is 90° C. or higher and preferably 115° C. or higher. As the melting end point of the ethylene-α-olefin copolymer increases, the shape can be maintained by the crystals of the ethylene-α-olefin copolymer even at high temperature. However, if the melting end point of the ethylene-α-olefin copolymer is excessively high, it is feared that deterioration in appearance may occur because of non-melted particles during heating for molding and premature crystallization (melt fracture) during cooling for molding. Therefore, the melting end point of the ethylene-α- olefin copolymer is generally 145° C. or lower. The melting end point of the ethylene-α-olefin copolymer used as component (B') is measured by a method described in Examples described later.

The density of the ethylene-α-olefin copolymer used as component (B') (measured according to JIS K6922-1,2: 1997) is preferably 0.850 to 0.910 g/cm$^3$, more preferably 0.860 to 0.900 g/cm$^3$, and still more preferably 0.860 to 0.880 g/cm$^3$. When the density is equal to or less than the above upper limit, the ethylene-α-olefin copolymer tends to be soft and excellent in sealing performance. When the density is equal to or higher than the above lower limit, the shape can be maintained at room temperature, and hysteresis loss is small. Therefore, the permanent set tends to be excellent.

The content of ethylene units in the ethylene-α-olefin copolymer used as component (B') is preferably 50% to 99% by mass and more preferably 60% to 95% by mass. When the content of ethylene units is within the above range, the elastomer composition obtained tends to be excellent in mechanical strength and rubber elasticity.

The melt flow rate (MFR) of the ethylene-α-olefin copolymer used as component (B') that is measured according to JIS K7210 (1999) under the conditions of a temperature of 190° C. and a load of 21.2 N is preferably 0.01 to 30 g/10 minutes. If the MFR is excessively high, the compression set is large, and the sealing performance may deteriorate. If the MFR is excessively small, the load on a motor during modification extrusion is large, and the pressure of resin is high. In this case, productivity may deteriorate, and the surface of a molded product may be roughened. From these points of view, the MFR of the ethylene-α-olefin copolymer used as component (B') is more preferably from 0.1 g/10 minutes to 10 g/10 minutes inclusive.

The ethylene-α-olefin copolymer used as component (B') can be obtained as a commercial product. For example, a suitable one selected from ENGAGE (registered trademark) series manufactured by the Dow Chemical Company, KERNEL (registered trademark) series manufactured by Japan Polyethylene Corporation, INFUSE (registered trademark) series manufactured by the Dow Chemical Company, TAFMER (registered trademark) series manufactured by Mitsui Chemicals, Inc., and EVOLUE (registered trademark) series manufactured by Mitsui Chemicals, Inc. can be used.

Only one ethylene-α-olefin copolymer used as component (B') may be used alone, or two or more ethylene-α-olefin copolymers may be used in any combination at any ratio.

<Component (D): Unsaturated Silane Compound>

The unsaturated silane compound used as component (D) in the second invention can be the same as the unsaturated silane compound used as component (D) in the first invention. The operational advantages and preferred modes of compound (D) in the second invention are the same as those in the first invention. Therefore, the description of component (D) in the first invention is applied to component (D) in the second invention without any changes.

<Component (E): Peroxide>

The peroxide used as component (E) in the second invention can be the same as the peroxide used as component (E) in the first invention. The operational advantages and preferred modes of compound (E) in the second invention are the same as those in the first invention. Therefore, the description of component (E) in the first invention is applied to component (E) in the second invention without any changes.

<Component (F): Crosslinking Aid>

The crosslinking aid used as component (F) in the second invention can be the same as the crosslinking aid used as component (F) in the first invention. The operational advantages and preferred modes of compound (F) in the second invention are the same as those in the first invention. Therefore, the description of component (F) in the first invention is applied to component (F) in the second invention without any changes.

<Component (G): Softener>

The softener used as component (G) in the second invention can be the same as the softener used as component (G) in the first invention. The operational advantages and preferred modes of compound (G) in the second invention are the same as those in the first invention. Therefore, the description of component (G) in the first invention is applied to component (G) in the second invention without any changes.

<Component (H): Silanol Condensation Catalyst>

The silanol condensation catalyst used as component (H) in the second invention can be the same as the silanol condensation catalyst used as component (H) in the first invention. The operational advantages and preferred modes of compound (H) in the second invention are the same as those in the first invention. Therefore, the description of component (H) in the first invention is applied to component (H) in the second invention without any changes.

<Mixing Ratio>

Preferably, the modified elastomer composition of the second invention contains component (A) in an amount of 5 to 80 parts by mass and component (B') in an amount of 95 to 20 parts by mass such that the sum of these amounts is 100 parts by mass. If the content of component (A) is larger than the above upper limit and the content of component (B') is lower than the above lower limit, it is feared that a good appearance tends not to be obtained. If the content of component (A) is lower than the above lower limit and the content of component (B') is larger than the above upper limit, gloss tends to increase, and it is feared that blocking is likely to occur. From these points of view, the ratio of component (A) relative to 100 parts by mass of the total of component (A) and component (B') is more preferably 5 to 70 parts by mass and still more preferably 5 to 50 parts by mass, and the ratio of component (B') is more preferably 95 to 30 parts by mass and still more preferably 95 to 50 parts by mass.

From the viewpoint of allowing the crosslinking reaction to proceed sufficiently, the content of component (D) is preferably 0.01 to 5 parts by mass, more preferably 0.05 to 5 parts by mass, and still more preferably 0.1 to 3 parts by mass based on 100 parts by mass of the total of component (A) and component (B').

The content of component (E) is preferably 0.01 to 3 parts by mass based on 100 parts by mass of the total of component (A) and component (B'). From the viewpoint of obtaining a sufficient crosslinking reaction and maintaining a smooth molded appearance, the content of component (E) is more preferably 0.05 to 2 parts by mass and still more preferably 0.1 to 1 part by mass.

When the modified elastomer composition of the second invention contains component (F), the content of component (F) is 0.001 to 2 parts by mass based on 100 parts by mass of the total of component (A) and component (B'). From the viewpoint of economic efficiency and obtaining a sufficient crosslinking reaction, the content of component (F) is preferably 0.003 to 1 part by mass.

When the modified elastomer composition of the second invention contains component (G), the content of component (G) (including the hydrocarbon-based rubber softener in component (A) when the component (A) used is of the oil-extended type) is 0.5 to 200 parts by mass based on 100 parts by mass of the total of component (A) and component (B'). If the content of component (G) is less than the above lower limit, the effects of improving the flexibility, flowability, and oil resistance by component (G) are insufficient. If the content of component (G) exceeds the above upper limit, it is feared that bleeding of component (G) on the surface may occur. From this point of view, the content of component (G) is preferably 1 to 100 parts by mass and more preferably 5 to 80 parts by mass based on 100 parts by mass of the total of component (A) and component (B').

When the silanol condensation catalyst used as component (H) is added to the modified elastomer composition of the second invention to allow the crosslinking reaction to proceed, no particular limitation is imposed on the amount of the silanol condensation catalyst added. The amount of the silanol condensation catalyst added is preferably 0.001 to 0.5 parts by mass and more preferably 0.001 to 0.1 parts by mass based on 100 parts by mass of the modified elastomer composition of the second invention excluding component (H). It is preferable that the amount of the silanol condensation catalyst added is equal to or more than the above lower limit because the crosslinking reaction proceeds sufficiently and the heat resistance tends to be good. It is preferable that the amount of the silanol condensation catalyst added is equal to or lower than the upper limit because premature crosslinking is unlikely to occur in an extruder and the surface of a strand and the appearance of products are unlikely to be roughened.

<Additional Components>

The modified elastomer composition of the second invention may contain, in addition to the above components, additional components such as various additives, fillers, resins and elastomers other than components (A) and (B') etc. so long as the effects of the invention are not impaired.

Examples of the additives are the same as the above-described additives that can be contained in the modified elastomer composition of the first invention.

In the second invention, as in the first invention, it is preferable that an antioxidant, particularly a phenol-based antioxidant, a sulfur-based antioxidant, or a phosphorus-based antioxidant, is contained.

Preferably, the antioxidant is contained in an amount of 0.1% to 1% by mass based on 100% by mass of the modified elastomer composition of the second invention.

Examples of the additional resins are the same as the above-described resins that can be contained in the modified elastomer composition of the first invention.

<Production and Molding of Modified Elastomer Composition>

The modified elastomer composition of the second invention can be produced by melting and kneading the two copolymers used as components (A) and (B'), the unsaturated silane compound used as component (D), the peroxide used as component (E), an optional crosslinking aid, an optional softener, and other optional components using a well-known method. The description of the melting and kneading, the molding method when the silanol condensation catalyst is used, etc. in the section <Production and molding of modified elastomer composition> in the first invention can be applied to the second invention without any changes.

[Applications]

No particular limitation is imposed on the applications of the modified elastomer composition and crosslinked elastomer composition of the present invention. The modified elastomer composition and the crosslinked elastomer composition can be preferably used, for example, for automobile components such as glass run channels, weather strips, hoses, wiper blades, and gromets, building and industrial components such as packings, gaskets, cushions, rubber vibration isolators, and tubes, sports and sundry goods, medical components, food components, household electrical components, and wire-coating materials.

EXAMPLES

Specific modes of the present invention will be described in detail by way of Examples. However, the present invention is not limited to the following Examples so long as they fall within the scope of the invention.

Various production conditions and the values of evaluation results in the following Examples have meanings as preferred upper or lower limits in the embodiments of the present invention, and preferred ranges may be ranges defined by any combination of the above-described upper or lower values and values in the following Examples or any combination of the values in the following Examples.

Raw materials used to prepare elastomer compositions in the following Examples and Comparative Examples and methods for evaluating the obtained elastomer compositions are as follows.

[Raw Materials]

The raw materials used in the following Examples and Comparative Examples are as follows.

<Ethylene-α-Olefin-Non-Conjugated Diene Copolymer Rubber of Oil-Extended or Non-Oil-Extended Type>

(A-1): JSR EP (registered trademark) EP501EC (manufactured by JSR Corporation)
  V catalyst-based oil-extended EPDM
  Non-conjugated diene: 5-ethylidene-2-norbornene
  Content of diene: 5.5% by mass
  Content of ethylene units: 66% by mass
  Mooney viscosity: 54 ML (preheating: 1 minute, the value measured 4 minutes after the start of rotation) 125° C.
  Extender oil content: 40 parts by mass (A-2): Mitsui EPT (registered trademark) 3072EPM (manufactured by Mitsui Chemicals, Inc.)
  Metallocene catalyst-based oil-extended EPDM
  Non-conjugated diene: 5-ethylidene-2-norbornene
  Content of diene: 5.4% by mass
  Content of ethylene units: 64% by mass
  Mooney viscosity: 51 ML (preheating: 1 minute, the value measured 4 minutes after the start of rotation) 125° C.
  Extender oil content: 40 parts by mass (A-3): Mitsui EPT (registered trademark) 3092PM (manufactured by Mitsui Chemicals, Inc.)
  Metallocene catalyst-based non-oil-extended EPDM
  Non-conjugated diene: 5-ethylidene-2-norbornene
  Content of diene: 5.4% by mass
  Content of ethylene units: 66% by mass
  Mooney viscosity: 61 ML (preheating: 1 minute, the value measured 4 minutes after the start of rotation) 125° C.

(A-4): JSR EP (registered trademark) EP505EC (manufactured by JSR Corporation)
  V catalyst-based oil-extended EPDM
  Non-conjugated diene: 5-ethylidene-2-norbornene
  Content of ethylene units: 67% by mass
  Content of diene: 4.5% by mass Mooney viscosity: 64 ML (preheating: 1 minute, the value measured 4 minutes after the start of rotation) 125° C.
Extender oil content: 100 parts by mass
(A-5): JSR EP (registered trademark) EP57C (manufactured by JSR Corporation)
V catalyst-based non-oil-extended EPDM
Non-conjugated diene: 5-ethylidene-2-norbornene
Content of ethylene units: 66% by mass
Content of diene: 4.5% by mass
Mooney viscosity: 58 ML (preheating: 1 minute, the value measured 4 minutes after the start of rotation) 125° C.
<Ethylene-α-Olefin Copolymer>
(B-1): ENGAGE (registered trademark) XLT8677 (manufactured by the Dow Chemical Company)
Ethylene-α-olefin copolymer
α-Olefin: 1-octene
MFR: 0.5 g/10 minutes (190° C., load: 21.2 N)
Density: 0.87 g/cm$^3$
Melting end point: 123° C.
(B-2): TAFMER (registered trademark) A0550S (manufactured by Mitsui Chemicals, Inc.)
Ethylene-α-olefin copolymer
α-Olefin: butene
MFR: 0.5 g/10 minutes (190° C., load: 21.2 N)
Density: 0.86 g/cm$^3$
Melting end point: 58° C.
(The method for measuring the melting end points of the ethylene-α-olefin copolymers in components (B-1) and (B-2) is as described later.)
<Polyethylene or Propylene-Based Resin>
(C-1) Adflex Q300F manufactured by LyondellBasell
Propylene-α-olefin copolymer
MFR: 0.7 g/10 minutes (230° C., load: 21.2 N)
Content of propylene units: 65% by mass
α-Olefin: ethylene
(C-2) Adflex Q200F manufactured by LyondellBasell
Propylene-α-olefin copolymer
MFR: 0.8 g/10 minutes (230° C., load: 21.2 N)
Content of propylene units: 84% by mass
α-Olefin: ethylene
(C-3) Hifax X1956A manufactured by LyondellBasell
Propylene-α-olefin copolymer
MFR: 1.0 g/10 minutes (230° C., load: 21.2 N)
Content of propylene units: 90% by mass
α-Olefin: ethylene
(C-4) Hiflex CA7600A manufactured by LyondellBasell
Propylene-α-olefin copolymer
MFR: 2.0 g/10 minutes (230° C., load: 21.2 N)
Content of propylene units: 42% by mass
α-Olefin: ethylene
(C-5) Tefabloc 5013 manufactured by Mitsubishi Chemical Corporation
Propylene-α-olefin copolymer
MFR: 0.7 g/10 minutes (230° C., load: 21.2 N)
Content of propylene units: 79% by mass
α-Olefin: ethylene
(C-6) NOVATEC-PP EA9 manufactured by Japan Polypropylene Corporation
Propylene homopolymer
MFR: 0.5 g/10 minutes (230° C., load: 21.2 N)
(C-7) NOVATEC-HD HY430 manufactured by Japan Polyethylene Corporation
High-density polyethylene
MFR: 0.8 g/10 minutes (190° C., load: 21.2 N)
Density: 0.956 cm$^3$/g <Unsaturated Silane Compound>
(D-1) Vinyltrimethoxysilane: KBM-1003 (manufactured by Shin-Etsu Chemical Co., Ltd.)
<Organic Peroxide>
(E-1) Di(2-tert-butylperoxyisopropyl)benzene: PERBUTYL P (manufactured by NOF CORPORATION)
(E-2) Di-tert-butyl peroxide: PERBUTYL D (manufactured by NOF CORPORATION)
(E-3) 2,5-Dimethyl-2,5-di(t-butylperoxy)hexane: Kayahexa AD40C (manufactured by Kayaku Akzo Corporation, mixture of 40% by mass of 2,5-dimethyl-2,5-di(t-butylperoxy)hexane and 60% by mass of organic filler)
<Crosslinking Aid>
(F-1) Divinylbenzene (manufactured by Wako Pure Chemical Industries, Ltd., mixture of 55% by mass of divinylbenzene and 45% by mass of ethylvinylbenzene)
(F-2) Triallyl cyanurate (manufactured by Wako Pure Chemical Industries, Ltd.)
<Softener>
(G-1) Paraffinic rubber softener: Diana (registered trademark) process oil PW90 (manufactured by Idemitsu Kosan Co., Ltd., paraffinic oil)
Kinematic viscosity at 40° C.: 95.54 cSt (centistokes)
Pour point: −15° C.
Flash point: 272° C.
<Catalyst Masterbatch (MB)>
(H-1) Silanol condensation catalyst MB: LZ033 (manufactured by Mitsubishi Chemical Corporation, 1.2% tin catalyst (dioctyltin dilaurate)-containing linear low-density polyethylene, MFR of low-density polyethylene: 2 g/10 minutes (190° C., load: 21.2 N), density of low-density polyethylene: 0.92 g/cm$^3$)
[Measurement of Melting End Point of Ethylene-α-Olefin Copolymer]
A differential scanning calorimeter manufactured by Hitachi High-Tech Science Corporation with a product name of "DSC6220" was used to determine the melting end point according to JIS K7121. Specifically, about 5 mg of a sample was heated from 20° C. to 200° C. at a heating rate of 100° C./minutes, held at 200° C. for 3 minutes, cooled to −10° C. at a cooling rate of 10° C./minutes, and then heated to 200° C. at a heating rate of 10° C./minutes. An extrapolated peak end point (° C.) was computed from a thermogram measured during heating to 200° C. at a heating rate of 10° C./minutes and used as the melting end point.
[Evaluation Methods]
Various evaluation methods for elastomer compositions in Examples and Comparative Examples are indicated below.
(1) Surface Hardness
The Duro-A hardness (15 seconds after) of a molded sheet obtained was measured according to JIS K6253 (Duro-A).
(2) Compression Set
A molded sheet obtained was subjected to measurement at 70° C. for 22 hours under the condition of 25% compression according to JIS K6262.
(3) Extrusion-Molded Appearance
The surface state of a sheet (surface area: 250 cm$^2$) for extrusion-molded appearance evaluation was visually inspected, and its surface smoothness was evaluated according to the following criteria.
Excellent: The extrusion-molded appearance is very good.
Good: The extrusion-molded appearance is good.
Fair: The extrusion-molded appearance is somewhat poor but is in a permissible range.
Poor: The extrusion-molded appearance is very poor.

(4) Gloss

The gloss of a molded sheet obtained was measured according to JIS Z8741.

(5) Blocking Tendency

When, during cutting of a strand of a kneaded modified elastomer composition, all the cut pieces of the composition underwent blocking to form a lump and therefore the strand could not be cut, the modified elastomer composition was rated "poor." When the obtained composition partially underwent blocking, the composition was rated "fair." When no blocking was found, the composition was rated "good."

Examples and Comparative Examples in First Invention

Example I-1

Raw materials except for (G-1) were mixed at a mixing ratio indicated in Table 1 and stirred for 1 minute in a Henschel mixer. Next, the obtained mixture was charged into an upstream supply port of a co-rotation twin screw extruder (manufactured by The Japan Steel Works, Ltd., product number: TEX30, L/D=46, the number of cylinder blocks: 12) using a mass-type feeder. A liquid addition pump was used to supply component (G-1) from a supply port provided in an intermediate portion of the extruder. A region between upstream and downstream portions was heated within the range of 120° C. to 200° C. to perform melting and kneading at a total delivery rate of 25 kg/h, and pellets were formed to thereby produce a modified elastomer composition.

4 Parts by mass of LZ033 (0.048 parts by mass as a tin catalyst) used as (H-1): the silanol condensation catalyst MB was added to 100 parts by mass of the obtained modified elastomer composition, and a modified elastomer composition containing the catalyst MB was thereby obtained. The composition was injection-molded using an inline screw injection molding machine (manufactured by TOSHIBA MACHINE CO., LTD., product number: IS130) under the conditions of an injection pressure of 50 MPa, a cylinder temperature of 220° C., and a die temperature of 40° C. to form sheets with a thickness of 2 mm×a width of 120 mm×a length of 80 mm. Then the sheets were left to stand in a thermo-hygrostat under the conditions of 85° C. and 85% RH for 24 hours to obtain sheets for evaluation of surface hardness and compression set.

Separately, 4 parts by mass of LZ033 (0.048 parts by mass as a tin catalyst) used as (H-1): the silanol condensation catalyst MB was added to 100 parts by mass of the modified elastomer composition. The modified elastomer composition containing the catalyst MB was subjected to a single-screw extruder manufactured by MITSUBISHI HEAVY INDUSTRIES, LTD. and having a diameter of 40 mm (L/D=22, compression ratio=2.77, full-flight screw) using a sheet-shaped die with a width of 25 mm and a thickness of 1 mm. The resulting modified elastomer composition was molded under the conditions of a molding temperature at a portion below a hopper: 170° C., a cylinder temperature of 180° C. to 200° C., a die temperature of 200° C., and a screw rotation speed of 30 rpm to obtain a sheet for extrusion-molded appearance evaluation.

The physical properties of the elastomer composition obtained in Example I-1 and the results of the extrusion-molded appearance evaluation are indicated in Table 1.

Examples I-2 to 9 and Comparative Examples I-1 to 3

The same procedure as in Example I-1 was repeated except that the mixing ratio of the raw materials was changed to one of mixing ratios indicated in Table 1 to obtain pellets of modified elastomer compositions in Examples I-2 to 9 and Comparative Examples I-1 to 3, and sheets for evaluation were molded using the modified elastomer compositions in the same manner as in Example I-1. Their physical properties and the results of the extrusion-molded appearance evaluation are indicated in Table 1.

In Table 1, the mixing amounts of components (A-1) and (A-2) are not the actual mixing amounts but are the amounts of only EPDM in components (A-1) and (A-2), and the amounts of oil in these components are separately indicated in component (G).

Similarly, the mixing amount of component (E-3) is not the actual mixing amount but is the mixing amount of only 2,5-dimethyl-2,5-di(t-butylperoxy)hexane in component (E-3) (40% of the actual mixing amount). The amount of component (F-1) is not the actual mixing amount but is the amount of only divinylbenzene in component (F-1) (55% of the actual mixing amount).

TABLE 1

| | | | | Example I-1 | Example I-2 | Example I-3 | Example I-4 | Example I-5 | Example I-6 | Example I-7 |
|---|---|---|---|---|---|---|---|---|---|---|
| Raw material mixture | A | A-1 | EPDM *1 | | | 15 | | | | |
| | | A-2 | EPDM *2 | 15 | 15 | | 15 | 15 | 15 | 15 |
| | B | B-1 | Ethylene-α-olefin copolymer | 85 | 85 | 85 | 85 | 85 | 85 | 85 |
| (parts by mass) | Total of A + B | | | 100 | 100 | 100 | 100 | 100 | 100 | 100 |
| | C | C-1 | Propylene-α-olefin copolymer | 21 | 21 | | | | | |
| | | C-2 | Propylene-α-olefin copolymer | | | 21 | | | | |
| | | C-3 | Propylene-α-olefin copolymer | | | | 16 | | | |
| | | C-4 | Propylene-α-olefin copolymer | | | | | 21 | | |
| | | C-5 | Propylene-α-olefin copolymer | | | | | | 21 | |
| | | C-6 | Propylene homopolymer | | | | | | | |
| | | C-7 | High-density polyethylene | | | | | | | 21 |
| | D | D-1 | Unsaturated silane compound | 2.13 | 2.13 | 2.13 | 2.13 | 2.13 | 2.13 | 2.13 |
| | E | E-3 | Peroxide *3 | 0.17 | 0.17 | 0.17 | 0.17 | 0.17 | 0.17 | 0.17 |
| | F | F-1 | Crosslinking aid *4 | 0.03 | 0.03 | 0.03 | 0.03 | 0.03 | 0.03 | 0.03 |
| | G | G-1 | Softener | 11 | 11 | 11 | 11 | 11 | 11 | 11 |
| | | | Oil in -A-1 | | | 6 | | | | |
| | | | Oil in A-2 | 6 | | | 6 | 6 | 6 | 6 |
| | | | Total of Gs | 17 | 17 | 17 | 17 | 17 | 17 | 17 |

TABLE 1-continued

| Evaluation results | Surface hardness | Duro-A 15 seconds after | 70.2 | 69.2 | 68.3 | 70.7 | 70.6 | 68.6 | 79.7 |
|---|---|---|---|---|---|---|---|---|---|
| | Compression set | 70° C., 22 hr., 25% | 16.2 | 16.6 | 18.0 | 18.0 | 16.7 | 18.8 | 18.2 |
| | Extrusion-molded appearance | Visual inspection | Excellent | Good | Good | Good | Good | Excellent | Excellent |

| | | | | | Example I-8 | Example I-9 | Comparative Example 1-1 | Comparative Example I-2 | Comparative Example I-3 |
|---|---|---|---|---|---|---|---|---|---|
| Raw material mixture (parts by mass) | A | A-1 | | EPDM *1 | | | | | |
| | | A-2 | | EPDM *2 | 15 | 15 | | | 15 |
| | B | B-1 | | Ethylene-α-olefin copolymer | 85 | 85 | 100 | 100 | 85 |
| | Total of A + B | | | | 100 | 100 | 100 | 100 | 100 |
| | C | C-1 | | Propylene-α-olefin copolymer | | 21 | 25 | | 21 |
| | | C-2 | | Propylene-α-olefin copolymer | | | | | |
| | | C-3 | | Propylene-α-olefin copolymer | | | | | |
| | | C-4 | | Propylene-α-olefin copolymer | | | | | |
| | | C-5 | | Propylene-α-olefin copolymer | | | | | |
| | | C-6 | | Propylene homopolymer | 16 | | | | |
| | | C-7 | | High-density polyethylene | | | | | |
| | D | D-1 | | Unsaturated silane compound | 2.13 | 2.13 | 2.50 | 2.00 | |
| | E | E-3 | | Peroxide *3 | 0.17 | 0.17 | 0.20 | 0.16 | 0.17 |
| | F | F-1 | | Crosslinking aid *4 | 0.03 | 0.00 | 0.04 | 0.03 | 0.03 |
| | G | G-1 | | Softener | 11 | 11 | 13 | 10 | 11 |
| | | Oil in -A-1 | | | | | | | |
| | | Oil in A-2 | | | 6 | 6 | | | 6 |
| | Total of Gs | | | | 17 | 17 | 13 | 10 | 17 |
| Evaluation results | Surface hardness | Duro-A 15 seconds after | | | 74.2 | 70 | 74.9 | 70.7 | 61.7 |
| | Compression set | 70° C., 22 hr., 25% | | | 19.0 | 17.6 | 16.9 | 14.7 | 27.6 |
| | Extrusion-molded appearance | Visual inspection | | | Good | Good | Poor | Poor | Poor |

*1 Mixing amount of only EPDM in component (A-1)
*2 Mixing amount of only EPDM in component (A-2)
*3 Mixing amount of only 2,5-dimethyl-2,5-di(t-butylperoxy)hexane in component (E-3)
*4 Mixing amount of only divinylbenzene in component (F-1)

[Evaluation Results]

As indicated in Table 1, in each of Examples I-1 to 9 corresponding to the elastomer composition of the first invention, the compression set characteristics and the extrusion-molded appearance were good.

As can be seen from these results, the elastomer composition of the first invention has good sealing characteristics and good extrusion-molded appearance.

In Comparative Examples I-1 and 2, one or both of components (A) and (C) were not used, and the extrusion-molded appearance was poor.

In Comparative Example I-3, component (D) was not used, and the crosslinking reaction did not proceed sufficiently. Therefore, the surface hardness was low, and the compression set characteristics and the extrusion-molded appearance were very poor.

As described above, in the elastomer compositions in Comparative Examples I-1 to 3, any of the compression set and the extrusion-molded appearance was insufficient.

Examples and Comparative Examples in Second Invention

Example II-1

Raw materials except for (G-1) were mixed at a mixing ratio indicated in Table 2 and stirred for 1 minute in a Henschel mixer. Next, the obtained mixture was charged into an upstream supply port of a co-rotation twin screw extruder (manufactured by The Japan Steel Works, Ltd., product number: TEX30, L/D=46, the number of cylinder blocks: 12) using a mass-type feeder. A liquid addition pump was used to supply component (G-1) from a supply port provided in an intermediate portion of the extruder. A region between upstream and downstream portions was heated within the range of 120° C. to 200° C. to perform melting and kneading at a total delivery rate of 25 kg/h, and a strand was cut to produce pellets of a modified elastomer composition.

4 Parts by mass of LZ033 (0.048 parts by mass as a tin catalyst) used as (H-1): the silanol condensation catalyst MB was added to 100 parts by mass of the obtained modified elastomer composition, and a crosslinked elastomer composition containing the catalyst MB was thereby obtained. The composition was injection-molded using an inline screw injection molding machine (manufactured by TOSHIBA MACHINE CO., LTD., product number: IS130) under the conditions of an injection pressure of 50 MPa, a cylinder temperature of 220° C., and a die temperature of 40° C. to form sheets with a thickness of 2 mm×a width of 120 mm×a length of 80 mm. Then the sheets were left to stand in a thermo-hygrostat under the conditions of 85° C. and 85% RH for 24 hours to obtain sheets for evaluation of surface hardness, compression set, and gloss.

The results of evaluation of the elastomer composition obtained in Example II-1 are indicated in Table 2.

Examples II-2 to 14 and Comparative Examples II-1 to 5

The same procedure as in Example II-1 was repeated except that the mixing ratio of the raw materials was changed to one of mixing ratios indicated in Tables 2 to 4 to obtain pellets of modified elastomer compositions in Examples II-2 to 14 and Comparative Examples II-1 to 5, and sheets for evaluation were molded using the modified elastomer compositions in the same manner as in Example II-1 and evaluated in the same manner.

The results are indicated in Tables 2 to 4.

In Tables 2 to 4, the mixing amounts of components (A-1), (A-2), and (A-4) are not the actual mixing amounts but are the amounts of only EPDM in components (A-1), (A-2), and (A-4) excluding the extender oil.

Similarly, the mixing amount of component (E-3) is not the actual mixing amount but is the mixing amount of only 2,5-dimethyl-2,5-di(t-butylperoxy)hexane in component (E-3) (40% of the actual mixing amount). The amount of component (F-1) is not the actual mixing amount but is the amount of only divinylbenzene in component (F-1) (55% of the actual mixing amount).

TABLE 2

| | | | | | Example | | | | | | | | |
|---|---|---|---|---|---|---|---|---|---|---|---|---|---|
| | | | | | II-1 | II-2 | II-3 | II-4 | II-5 | II-6 | II-7 | II-8 | II-9 |
| Raw material mixture (parts by mass) | A | A-2 | EPDM *1 | | 15 | | | | | 33 | 15 | 15 | 15 |
| | | A-3 | EPDM | | | 33 | | | | | | | |
| | | A-1 | EPDM *1 | | | | 33 | | | | | | |
| | | A-4 | EPDM *1 | | | | | 33 | | | | | |
| | | A-5 | EPDM | | | | | | 33 | | | | |
| | B | B-1 | Ethylene-α-olefin copolymer | | 85 | 67 | 67 | 67 | 67 | 67 | 85 | 85 | 85 |
| | Total of A + B | | | | 100 | 100 | 100 | 100 | 100 | 100 | 100 | 100 | 100 |
| | D | D-1 | Unsaturated silane compound | | 2.1 | 2.7 | 2.7 | 2.7 | 2.7 | 2.7 | 2.1 | 1.1 | 2.1 |
| | E | E-1 | Peroxide | | 0.17 | 0.21 | 0.21 | 0.21 | 0.21 | 0.21 | | 0.17 | |
| | | E-2 | Peroxide | | 0.03 | 0.04 | 0.04 | 0.04 | 0.04 | 0.04 | | 0.01 | |
| | | E-3 | Peroxide *2 | | | | | | | | 0.17 | | 0.17 |
| | Total of Es | | | | 0.20 | 0.25 | 0.25 | 0.25 | 0.25 | 0.25 | 0.17 | 0.18 | 0.17 |
| | F | F-1 | Crosslinking aid *3 | | 0.053 | 0.067 | 0.067 | 0.067 | 0.067 | 0.067 | 0.053 | | |
| | | F-2 | Crosslinking aid | | | | | | | | | 0.053 | |
| | G | Oil in A-2 | | | 6.4 | | | | | 13.3 | 6.4 | 6.1 | |
| | | Oil in A-1 | | | | | 13.3 | | | | | | |
| | | Oil in A-4 | | | | | | 33.3 | | | | | |
| | | G-1 | Softener | | 10.6 | 33.3 | 20.0 | | 33.3 | 20.0 | 10.6 | 10.6 | 20.0 |
| | Total of Gs | | | | 17 | 33 | 33 | 33 | 33 | 33 | 17 | 17 | 20 |
| Evaluation results | Gloss | | | | 5.2 | 12.8 | 7.2 | 5.5 | 13.6 | 9.4 | 12.5 | 8.3 | 12.5 |
| | Surface hardness | Duro-A 15 seconds after | | | 64 | 59 | 55 | 57 | 56 | 59 | 67 | 60 | 70 |
| | Compression set | 70° C., 22 hr., 25% | | | 13 | 13 | 16 | 14 | 14 | 12 | 14 | 15 | 18 |
| | Blocking tendency | | | | Good | Good | Good | Good | Good | Good | Good | Good | Good |

*1 Mixing amount of only EPDM in component (A-1), (A-2), or (A-4)
*2 Mixing amount of only 2,5-dimethyl-2,5-di(t-butylperoxy)hexane in component (E-3)
*3 Mixing amount of only divinylbenzene in component (F-1)

TABLE 3

| | | | | | Example | | | | |
|---|---|---|---|---|---|---|---|---|---|
| | | | | | II-10 | II-11 | II-12 | II-13 | II-14 |
| Raw material mixture (parts by mass) | A | A-2 | EPDM *1 | | 15 | | | | |
| | | A-3 | EPDM | | | 20 | 20 | 30 | 30 |
| | B | B-1 | Ethylene-α-olefin copolymer | | 85 | 80 | 80 | 70 | 70 |
| | Total of A + B | | | | 100 | 100 | 100 | 100 | 100 |
| | D | D-1 | Unsaturated silane compound | | 2.1 | 2.0 | 2.0 | 2.0 | 2.0 |
| | E | E-1 | Peroxide | | 0.17 | 0.16 | 0.16 | 0.16 | 0.16 |
| | | E-2 | Peroxide | | 0.03 | 0.03 | 0.03 | 0.03 | 0.03 |
| | Total of Es | | | | 0.20 | 0.19 | 0.19 | 0.19 | 0.19 |
| | F | F-2 | Crosslinking aid | | 0.053 | 0.050 | 0.050 | 0.050 | 0.050 |
| | G | Oil in A-2 | | | 6.4 | | | | |
| | | G-1 | Softener | | 10.6 | 10 | 20 | 20 | 30 |
| | Total of Gs | | | | 17 | 10 | 20 | 20 | 30 |

TABLE 3-continued

|  |  |  | Example | | | | |
|---|---|---|---|---|---|---|---|
|  |  |  | II-10 | II-11 | II-12 | II-13 | II-14 |
| Evaluation results | Gloss | | 2.9 | 7 | 9.1 | 3.6 | 4.9 |
| | Surface hardness | Duro-A 15 seconds after | 65 | 63 | 59 | 59 | 55 |
| | Compression set | 70° C., 22 hr., 25% | 13.8 | 14.1 | 13.2 | 13.4 | 13 |
| | Blocking tendency | | Good | Good | Good | Good | Good |

*1 Mixing amount of only EPDM in component (A-2)

TABLE 4

|  |  |  |  | Comparative Example | | | | |
|---|---|---|---|---|---|---|---|---|
|  |  |  |  | II-1 | II-2 | II-3 | II-4 | II-5 |
| Raw material mixture (parts by mass) | A | A-2 | EPDM *1 | 15 | 15 | | | 15 |
| | B | B-1 | Ethylene-α-olefin copolymer | | 85 | 100 | 100 | |
| | | B-2 | Ethylene-α-olefin copolymer | 85 | | | | 85 |
| | Total of A + B | | | 100 | 100 | 100 | 100 | 100 |
| | D | D-1 | Unsaturated silane compound | | | 2 | 2 | 2 |
| | E | E-1 | Peroxide | 0.17 | 0.17 | 0.16 | | 0.17 |
| | | E-2 | Peroxide | 0.03 | 0.03 | 0.03 | | 0.03 |
| | | E-3 | Peroxide *2 | | | | 0.16 | |
| | Total of Es | | | 0.20 | 0.20 | 0.19 | 0.16 | 0.20 |
| | F | F-1 | Crosslinking aid *3 | 0.05 | 0.05 | 0.05 | 0.05 | 0.05 |
| | G | | Oil in A-2 | 6 | 6 | | | 6 |
| | | G-1 | Softener | 10.6 | 10.6 | 10 | 10 | 10.6 |
| | Total of Gs | | | 17 | 17 | 10 | 10 | 17 |
| Evaluation results | Gloss | | | — | 26 | 35 | 18 | — |
| | Surface hardness | | Duro-A 15 seconds after | — | 56 | 67 | 71 | — |
| | Compression set | | 70° C., 22 hr., 25% | — | 19 | 13 | 14.7 | — |
| | Blocking tendency | | | Poor | Good | Fair | Fair | Poor |

*1 Mixing amount of only EPDM in component (A-2)
*2 Mixing amount of only 2,5-dimethyl-2,5-di(t-butylperoxy)hexane in component (E-3)
*3 Mixing amount of only divinylbenzene in component (F-1)

[Evaluation Results]

As indicated in Tables 2 and 3, in each of Examples II-1 to 14 corresponding to the elastomer composition of the second invention, the compression set and the blocking resistance were good, and the gloss was low.

In the elastomer compositions in Comparative Examples II-1 to 5, at least one of the compression set, the low gloss, and the blocking resistance was insufficient.

As can be seen from these results, the elastomer composition of the second invention has good sealing characteristics, good extrusion-molded appearance, and good blocking resistance.

INDUSTRIAL APPLICABILITY

The elastomer composition of the first invention is excellent in compression set and extrusion-molded appearance and can therefore be widely and effectively used for various applications that require these characteristics such as automobile components such as glass run channels and weather strips, civil and building components such as building gaskets, sporting goods, industrial components, household electrical components, medical components, food components, medical equipment components, electric wires, and sundry goods.

The elastomer composition of the second invention is excellent in compression set, molded appearance, and blocking resistance and can therefore be widely and effectively used for various applications that require these characteristics such as automobile components such as glass run channels and weather strips, civil and building components such as building gaskets, sporting goods, industrial components, household electrical components, medical components, food components, medical equipment components, electric wires, and sundry goods.

Although the present invention has been described in detail by way of the specific modes, it is apparent for those skilled in the art that various changes can be made without departing from the spirit and scope of the present invention.

The present application is based on Japanese Patent Application Nos. 2018-015414 and 2018-015416 filed on Jan. 31, 2018, the entire contents of which are incorporated herein by reference.

The invention claimed is:

1. A modified elastomer composition comprising following components (A), (B'), and (D),
   wherein the components (A), (B') and (D) are grafted with following component (E):
   component (A) comprising an ethylene-α-olefin-non-conjugated diene copolymer rubber;

component (B') comprising an ethylene-α-olefin copolymer rubber whose melting end peak temperature measured using a differential scanning calorimeter (DSC) is 90° C. or higher and which contains no non-conjugated diene units;
component (D) comprising an unsaturated silane compound; and
component (E) comprising a peroxide,
a content of the component (A) is 5 to 50 parts by mass based on 100 parts by mass of a total of the component (A) and the component (B'), and
a content of the component (B') is 95 to 50 parts by mass based on 100 parts by mass of the total of the component (A) and the component (B').

2. The modified elastomer composition according to claim 1,
wherein a content of the component (D) is 0.01 to 5 parts by mass based on 100 parts by mass of the total of the component (A) and the component (B').

3. The modified elastomer composition according to claim 1,
wherein an amount of the component (E) used is 0.01 to 3 parts by mass based on 100 parts by mass of a total of the component (A) and the component (B').

4. The modified elastomer composition according to claim 1,
wherein a density of the component (B') is 0.880 g/cm³ or less.

5. The modified elastomer composition according to claim 1, further comprising component (F) comprising a crosslinking aid in an amount of 0.001 to 2 parts by mass based on 100 parts by mass of a total of the component (A) and the component (B').

6. The modified elastomer composition according to claim 1,
wherein the component (D) is a compound represented by following formula (1):

RSi(R')₃        (1)

where R is an ethylenically unsaturated hydrocarbon group; R's are each independently a hydrocarbon group having 1 to 10 carbon atoms or an alkoxy group having 1 to 10 carbon atoms;
and at least one of R's is an alkoxy group having 1 to 10 carbon atoms.

7. The modified elastomer composition according to claim 1, further comprising component (G) comprising a softener in an amount of 0.5 to 200 parts by mass based on 100 parts by mass of a total of the component (A) and the component (B').

8. A crosslinked elastomer composition prepared by subjecting the modified elastomer composition according to claim 1 to a crosslinking reaction using component (H) comprising a silanol condensation catalyst.

9. A molded article prepared by molding the modified elastomer composition according to claim 1.

10. A molded article prepared by molding the crosslinked elastomer composition according to claim 8.

11. The modified elastomer composition according to claim 1, wherein a non-conjugated diene compound in the ethylene-α-olefin-non-conjugated diene copolymer rubber is dicyclopentadiene, 1,4-hexadiene, cyclohexadiene, cyclooctadiene, dicyclooctadiene, 1,6-octadiene, 5-methyl-1,4-hexadiene, 3,7-dimethyl-1,6-octadiene, 1,3-cyclopentadiene, 1,4-cyclohexadiene, 2-methyl-1,5-hexadiene, 6-methyl-1,5-heptadiene, 7-methyl-1,6-octadiene, tetrahydroindene, or methyltetrahydroindene.

12. The modified elastomer composition according to claim 1, wherein a non-conjugated diene compound in the ethylene-α-olefin-non-conjugated diene copolymer is 5-isopropylidene-2-norbornene, 5-vinyl-2-norbornene, vinylidenenorbornene, ethylidenenorbornene or methylenenorbornene.

13. The modified elastomer composition according to claim 1, wherein an α-olefin in the ethylene-α-olefin-non-conjugated diene copolymer rubber is propylene, 1-butene, 3-methyl-1-butene, 1-pentene, 4-methyl-1-pentene, 4,4-dimethyl-1-pentene, 1-hexene, 4-methyl-1-hexene, 1-heptene, 1-octene, 1-decene, or 1-octadecene.

14. The modified elastomer composition according to claim 1, wherein the ethylene-α-olefin-non-conjugated diene copolymer rubber includes an ethylene-propylene-5-ethylidene-2-norbornene copolymer rubber, an ethylene-propylene-dicyclopentadiene copolymer rubber, an ethylene propylene-1,4-hexadiene copolymer rubber, an ethylene propylene-5-vinyl-2-norbornene copolymer rubber or an ethylene-1-butene-5-ethylidene-2-norbornene copolymer rubber.

15. The modified elastomer composition according to claim 1, wherein the ethylene-α-olefin copolymer rubber includes copolymers of ethylene and one or two or more α-olefins having 3 to 10 carbon atoms, an ethylene-1-butene copolymer, an ethylene-4-methyl-1-pentene copolymer, an ethylene-1-hexene copolymer, or an ethylene-1-octene copolymer.

* * * * *